United States Patent [19]
Giles et al.

[11] Patent Number: 5,967,066
[45] Date of Patent: Oct. 19, 1999

[54] SYSTEM AND PROCESS FOR APPLYING AMMONIA TO SOIL

[75] Inventors: Durham K. Giles, Davis; Graeme W. Henderson, Pasadena, both of Calif.; Jeff Grimm, Hiawatha, Kans.

[73] Assignee: Capstan Ag Systems, Inc., Topeka, Kans.

[21] Appl. No.: 08/807,913

[22] Filed: Feb. 28, 1997

[51] Int. Cl.[6] .............................. A01G 25/09; G05D 7/01
[52] U.S. Cl. ........................................ 111/119; 137/486
[58] Field of Search ........................... 111/118, 119, 120, 111/127; 137/485, 486, 487.5, 489.5, 899, 561 A; 239/155, 156, 63

[56] References Cited

U.S. PATENT DOCUMENTS

| | | |
|---|---|---|
| 3,556,027 | 1/1971 | Ammann . |
| 4,341,168 | 7/1982 | Siebert . |
| 4,364,409 | 12/1982 | Jones ...................................... 137/486 |
| 4,458,609 | 7/1984 | Tofte . |
| 4,657,568 | 4/1987 | Jones . |
| 4,807,663 | 2/1989 | Jones . |
| 5,134,961 | 8/1992 | Giles et al. . |
| 5,170,820 | 12/1992 | Jones . |
| 5,574,657 | 11/1996 | Tofte et al. . |

OTHER PUBLICATIONS

Brochure, "New . . . from Capstan Ag Systems: SYN-CHRO™ The Next Generation of Ag Spraying Technology", Aug. 1995.

MID–TECH™—Complete Anhydrous Ammonia Control, p. 31, No Date.

"ARC–TASC NH3 Control System", pp. 33–34, No Date.

D.K. Giles and J.A. Comino, "Droplet Size and Spray Pattern Characteristics of An Electronic Flow Controller For Spray Nozzles", J. Agric. Engng. Res., vol. 47, pp. 249–267, 1990, California.

D.K. Giles and E. Ben–Salem, "Spray Droplet Velocity and Energy in Intermittent Flow from Hydraulic Nozzles", J. Agric. Engng. Res., vol. 51, pp. 101–112, 1992, Silsoe Research Institute, California.

D.K. Giles; B.W. Young; P.R. Alexander; M.H. French, Intermittent Control of Liquid Flow from Fan Nozzles in Concurrent Air Streams: Wind Tunnel Studies of Droplet Size Effects, J. Agric. Engng. Res., vol. 62, pp. 77–83, 1995, Silsoe Research Institute, California.

Durham K. Giles and John A. Comino, *SAE Technical Paper Series*, "Variable Flow Control for Pressure Atomization Nozzles", pp. 1–3, 1989, California.

U.S. Application Serial No. 08/528,941, filed Sep. 15, 1995, entitled "Independent Flow Rate and Droplet Size Control System and Method for Spraying".

*Primary Examiner*—Thomas B. Will
*Assistant Examiner*—Robert Pezzuto
*Attorney, Agent, or Firm*—Dority & Manning, P.A.

[57] ABSTRACT

The present invention is generally directed to a system and to a process for dispensing a volatile liquid fertilizer and particularly ammonia into a field. The ammonia is placed in a vessel under sufficient pressure to maintain a substantial portion of the ammonia in a liquid form. From the pressurized vessel, the ammonia is fed to a distribution manifold where it is ultimately injected into a soil through a plurality of dispensing tubes. According to the present invention, a constant pressure flow rate control device is placed at each dispensing tube for metering the amount of ammonia fed to the soil. In particular, the flow control devices allow ammonia to be dispensed from the system while maintaining sufficient back pressure within the distribution manifold to maintain the ammonia in a liquid form. By preventing vaporization of the ammonia within the system, uniform and accurately controlled flow rates can be dispensed from the dispensing tubes.

29 Claims, 4 Drawing Sheets

SYSTEM AND PROCESS FOR APPLYING AMMONIA TO SOIL

FIELD OF THE INVENTION

The present invention generally relates to a system and to a process for applying a volatile liquid fertilizer to soil. More particularly, the present invention is directed to a system that uniformly applies ammonia to soil. The system operates at a wide range of flow rates, offers fast response times when changing flow rates, and allows the application rates to be precisely controlled and varied in response to changing circumstances.

BACKGROUND OF THE INVENTION

Anhydrous ammonia ($NH_3$) is commonly used as a soil fertilizer, since it is the most concentrated practical form of nitrogen. In conventional systems, when applying ammonia to soil, ammonia is placed in a tank under pressure. The tank is placed on a trailer and towed by a tractor. Some of the ammonia in the tank vaporizes creating pressure. This pressure is not only used to maintain most of the material in a liquid form, but is also used to force or pump the liquid from the tank.

In particular, liquid ammonia in the tank is pumped through a pressure regulator to a distribution manifold which leads to individual lines. Each individual line is connected to an injection knife which plows through the soil and applies the ammonia. The ammonia, as it travels through the distribution manifold, undergoes a phase change forming a gas which is ultimately applied as a fertilizer.

In order to control application rates, conventional ammonia application systems typically include a controller which adjusts the flow rate of the ammonia in proportion to the ground speed of the tractor or vehicle. The objective of the system is to maintain a desired amount of ammonia applied per unit of land area, usually expressed as pounds per acre or kilograms per hectare. For instance, the vehicle speed can be detected with a radar sensor which sends the speed information to a microprocessor. Based on the ground speed data, the microprocessor calculates the proper flow rate of ammonia necessary to achieve a desired application rate.

The controller can also receive ammonia flow rate information from a flow meter, usually a turbine-type, placed in the supply line between the ammonia tank and the manifold. The flow rate is adjusted by the controller using an electrically-actuated regulating valve also installed between the tank and the manifold. The regulating valve is generally a throttling-type valve that simply closes to restrict flow by increasing the pressure drop across the valve or opens to increase flow by reducing the pressure drop across the valve.

A common problem with the above described system, however, is that the flow rate of the ammonia is difficult to accurately control and measure due to vaporization of the ammonia as it moves through the system. Vaporization of the ammonia can occur as a result of pressure decreases in the line due to emptying of the tank, as a result of warmer ambient conditions, and due to pressure drops that occur in the flow lines. Upon vaporization, the density of ammonia can change over a factor of 200:1. When the ammonia forms a liquid and vapor mixture, it cannot be measured accurately with the flow meter, which is designed only to measure liquid flow rates.

In order to remedy vaporization problems, the ammonia pumped from the pressurized tank can be chilled to a temperature so low that only liquid exists. This has been accomplished in the past by a refrigeration device that vents off a small amount of the ammonia (approximately 1%) flowing through the system. When the liquid ammonia is vented to atmospheric pressure, the heat of vaporization is absorbed from the system, cooling a heat exchanger which contacts the ammonia exiting the tank. The ammonia is then chilled and condensed to a pure liquid and thus can be easily metered. The ammonia vented to atmospheric pressure, on the other hand, can be directed into additional injector knives and applied to the soil.

The above described refrigeration system, however, only insures that the ammonia is in liquid form as it passes through the flow meter. The ammonia still vaporizes as it enters the distribution manifold creating other various problems. Specifically, pressure through the distribution manifold can vary between individual lines due to variable lengths and fittings. Pressure variations in the individual lines cause application rates of the ammonia to vary from knife to knife. This problem is especially magnified at lower pressures and flow rates where greater degrees of vaporization are more likely to occur.

Besides failing to maintain uniformity in the distribution of ammonia between the individual lines, the above described system also only operates within a narrow range of ammonia flow rates. The flow rate of the ammonia is directly tied to the pressure in the system. Specifically, the flow rate of ammonia is proportional to the square root of the pressure. Thus, in order to change flow rates, the pressure must be dramatically increased or decreased. For example, to achieve a 3:1 range of flow control, a 9:1 range of pressure variation is necessary. Pressure variation of the ammonia in the system, however, is limited to the range between the maximum pressure in the tank and the minimum pressure which can maintain the ammonia in a liquid state. Consequently, wide ranges of application rates are simply not practically possible.

Conventional systems as described above also have very slow response times due primarily to the slow actuation of the throttling valve used to control pressures and flow rates. Typical valves used in these systems can take between 1.5 to 10 seconds to change position.

Prior art systems have also failed to provide individual control of the flow of ammonia to each knife. As described above, the flow of ammonia is only controlled as it enters the distribution manifold, prior to the ammonia branching off into each individual line.

Thus, a need exists for an improved system and process for injecting volatile liquids, such as ammonia, into soil. In particular, a need exists for an ammonia application system that uniformly applies ammonia to soil, operates at a wide range of flow rates, offers fast response times when changing flow rates, and allows the ammonia application rates to be varied between the individual distribution lines.

SUMMARY OF THE INVENTION

The present invention recognizes and addresses the foregoing drawbacks and disadvantages of prior art constructions and methods.

Accordingly, it is an object of the present invention to provide improved processes and systems for applying an ammonia fertilizer to soil.

Another object of the present invention is to provide systems that accurately and uniformly apply ammonia to soil.

It is another object of the present invention to provide a system for applying ammonia to soil at a wide range of flow rates.

It is another object of the present invention to provide a system that applies ammonia to soil through a plurality of individual knives, wherein the flow rate of ammonia through each knife can be controlled independently.

Still another object of the present invention is to provide a system for applying ammonia to soil in which the flow rate of ammonia is controlled independently of the pressure of ammonia in the system.

Yet another object of the present invention is to provide a system for applying ammonia to soil in which the flow rate of ammonia through the system can be controlled and changed rapidly.

It is another object of the present invention to provide a system for applying ammonia to soil in which the ammonia remains a liquid throughout a distribution manifold through which the ammonia is pumped.

These and other objects of the present invention are achieved by providing a system for maintaining a volatile liquid fertilizer, such as ammonia, in a liquid form while dispensing controlled amounts of the fertilizer into a soil. The system includes a fertilizer reservoir for holding a volatile liquid fertilizer under pressure sufficient to maintain a substantial portion of the fertilizer in a liquid form. The fertilizer reservoir includes an outlet for dispensing the liquid fertilizer.

A distribution manifold is placed in communication with the outlet and is in turn connected to a plurality of dispensing tubes designed to inject the volatile liquid fertilizer into a soil. A flow meter is included for monitoring the flow rate of the volatile liquid fertilizer as it enters into the distribution manifold.

According to the present invention, the system also includes a plurality of constant pressure flow rate control devices, each of which is in communication with a corresponding dispensing tube. The constant pressure flow rate control devices control the flow rate at which the volatile liquid fertilizer is dispensed from the respective dispensing tubes without significantly decreasing the pressure of the fertilizer within the distribution manifold.

A controller in communication with the flow meter and the constant pressure flow rate control devices, adjusts the flow rate control devices for dispensing the volatile liquid fertilizer at a selected flow rate. The controller dispenses the fertilizer while maintaining the volatile liquid fertilizer at a pressure within the distribution manifold sufficient to maintain the fertilizer in a liquid form.

In one embodiment, each of the constant pressure flow rate control devices includes a valve that pulsates between open and closed positions according to a duty cycle. The duty cycle of each valve can be determined and controlled by the controller for controlling fertilizer flow rates. In fact, the controller can be configured to control the constant pressure flow rate control devices independently for varying the flow rate of the volatile liquid fertilizer between each of the dispensing tubes.

If desired, the system can further include a cooling device for cooling the volatile liquid fertilizer exiting the fertilizer reservoir. The cooling device can include a heat exchanger in contact with the volatile liquid fertilizer. The heat exchanger can receive and vaporize a portion of the volatile liquid fertilizer for cooling the remainder of the fertilizer as it enters the distribution manifold. The controller can be configured to determine the amount of the fertilizer that is vaporized in the heat exchanger for determining the extent to which the fertilizer is to be cooled.

In one preferred embodiment, the system includes a cooling device, a first temperature sensing device positioned adjacent to the cooling device, a second temperature sensing device positioned within the distribution manifold, and a pressure sensing device also located within the distribution manifold. The controller can be configured to receive information from both temperature sensing devices and from the pressure sensing device for automatically maintaining the volatile liquid fertilizer within preset temperature and pressure ranges within the system.

These and other objects are also achieved by providing a process for dispensing controlled amounts of a volatile liquid fertilizer into a soil. The process includes the steps of providing a volatile liquid fertilizer in a pressurized vessel. The pressure in the vessel is sufficient to maintain a substantial portion of the volatile liquid fertilizer in a liquid form. The volatile liquid fertilizer is dispensed into a distribution manifold.

From the distribution manifold, the fertilizer is injected into a soil at a predetermined flow rate through a plurality of dispensing tubes. In accordance with the present invention, the fertilizer is maintained in a liquid form throughout the distribution manifold.

For instance, the flow rate of the volatile liquid fertilizer entering the dispensing tubes can be controlled by a plurality of constant pressure flow rate control devices. The constant pressure flow rate control devices control the flow rate of the fertilizer without significantly reducing the pressure of the fertilizer within the distribution manifold. In one embodiment, the flow rate control devices can dispense the fertilizer while maintaining pressures within the distribution manifold from about 50 psi to about 200 psi.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is the description of exemplary embodiments only and is not intended as limiting the broader aspects of the present invention, which broader aspects are embodied in the exemplary construction.

The present invention is generally directed to a system and to a process for applying a volatile liquid fertilizer, such as ammonia, to a field. The system includes a pressurized tank for containing a volatile liquid fertilizer. The pressurized tank is in fluid communication with a distribution manifold, which is connected to a plurality of dispensing tubes that inject the fertilizer into a soil. In accordance with the present invention, the system includes a pressure-independent flow control device located at each dispensing tube. The flow control devices meter the volatile liquid fertilizer into the soil at a predetermined flow rate while maintaining sufficient back pressure within the distribution manifold to prevent the volatile liquid fertilizer from vaporizing. By maintaining the fertilizer in a liquid form throughout the system, many advantages and benefits are obtained that were not before realized in the prior art.

For instance, by preventing vaporization of the liquid fertilizer in the distribution manifold and supply lines, the flow of fertilizer to each dispensing tube is uniform. Further, because the system of the present invention uncouples the dependency between flow rate and liquid pressure, the system offers much greater flow control ranges. For example, thus far it has been shown that a 10:1 range of flow control of the liquid fertilizer is possible.

Besides operating at a wide range of flow rates, the system of the present invention has extremely fast response times when changing flow rates. Specifically, the system of the present invention is capable of changing flow rates at response times less than 0.5 seconds, which offers dramatic improvements over conventional systems that typically had response times between 1.5 seconds to 10 seconds. Further, because a flow control device is installed at each dispensing tube, the application rate of the fertilizer can be varied between each of the dispensing tubes. This resolution, coupled with the fast response times, allows total control of fertilizer application rates. In particular, the rate at which the fertilizer is injected into the soil can be continuously monitored and changed depending upon the speed at which the system is moved across a field, the type of soil that is being treated, the dimensions of the treated area, and based on any other factors and circumstances.

Figures 1, 2:
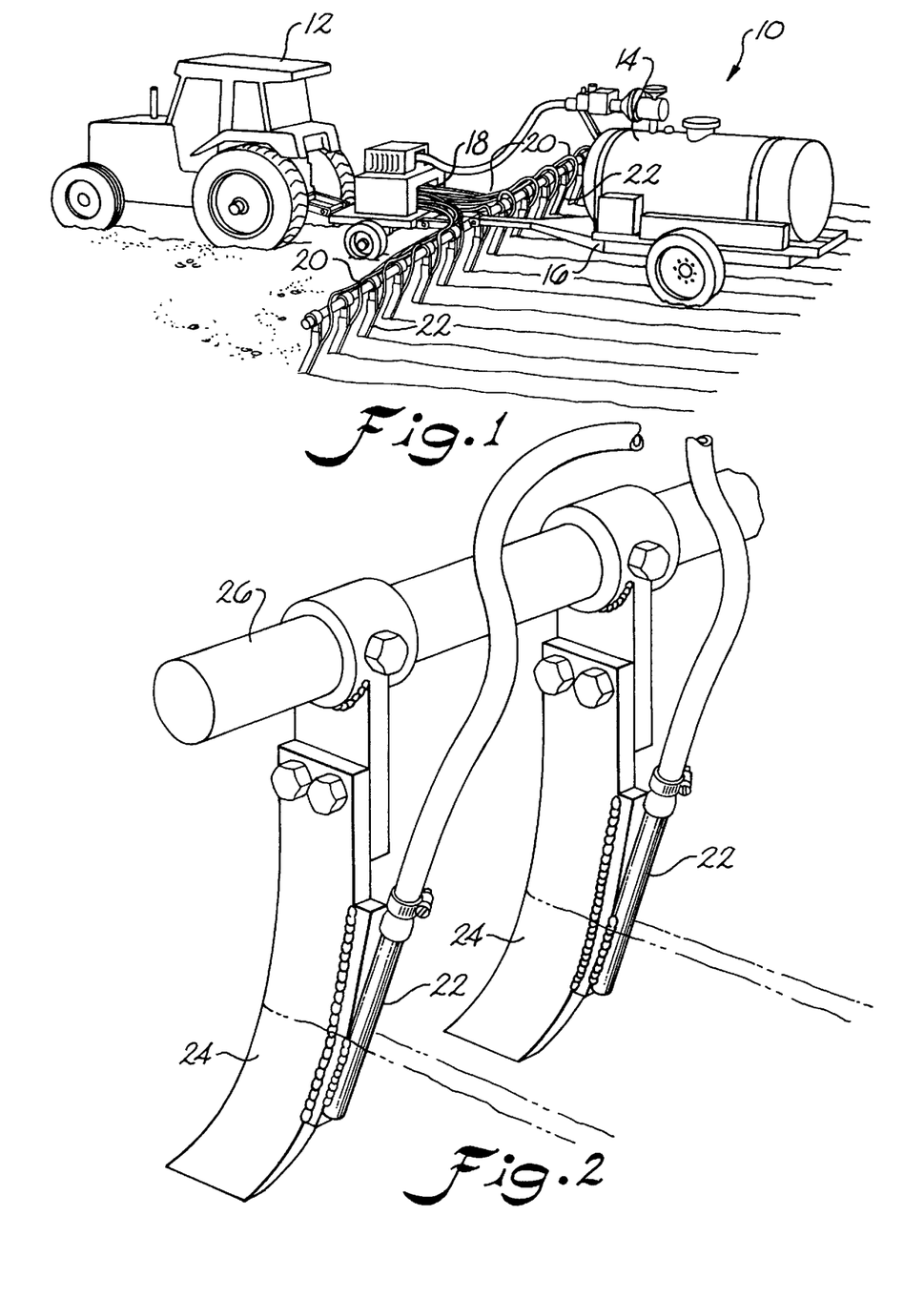
FIG. 1 is a perspective view of one embodiment of a system made in accordance with the present invention for dispensing a volatile liquid fertilizer into a soil.
FIG. 2 is an enlarged perspective view with cutaway portions of exemplary knives and corresponding dispensing tubes in accordance with the present invention for depositing a fertilizer in a soil.

Referring to FIG. 1, a volatile liquid fertilizer application system generally 10 is illustrated. System 10, in this embodiment, is being drawn across a field by a tractor 12. System 10 includes a pressurized vessel 14, which is adapted to hold and maintain a substantial portion of the volatile liquid fertilizer, which is normally ammonia, in a liquid state. As shown, pressurized vessel 14 can be mounted on a trailer 16 which is hitched to tractor 12.

The pressure contained within vessel 14 is used to pump the ammonia from the vessel into a distribution manifold 18. Distribution manifold 18 includes a plurality of supply lines 20. Supply lines 20 are each connected to a dispensing tube 22 for injecting the ammonia into a soil as more clearly illustrated in FIG. 2.

As shown, each of the dispensing tubes 22 are positioned behind a corresponding knife or chisel plow 24, which is adapted to plow through a field and allow the ammonia to be injected below the surface of the soil. Knives 24 are attached to a boom 26 which is also used to support supply lines 20.

Figure 3:
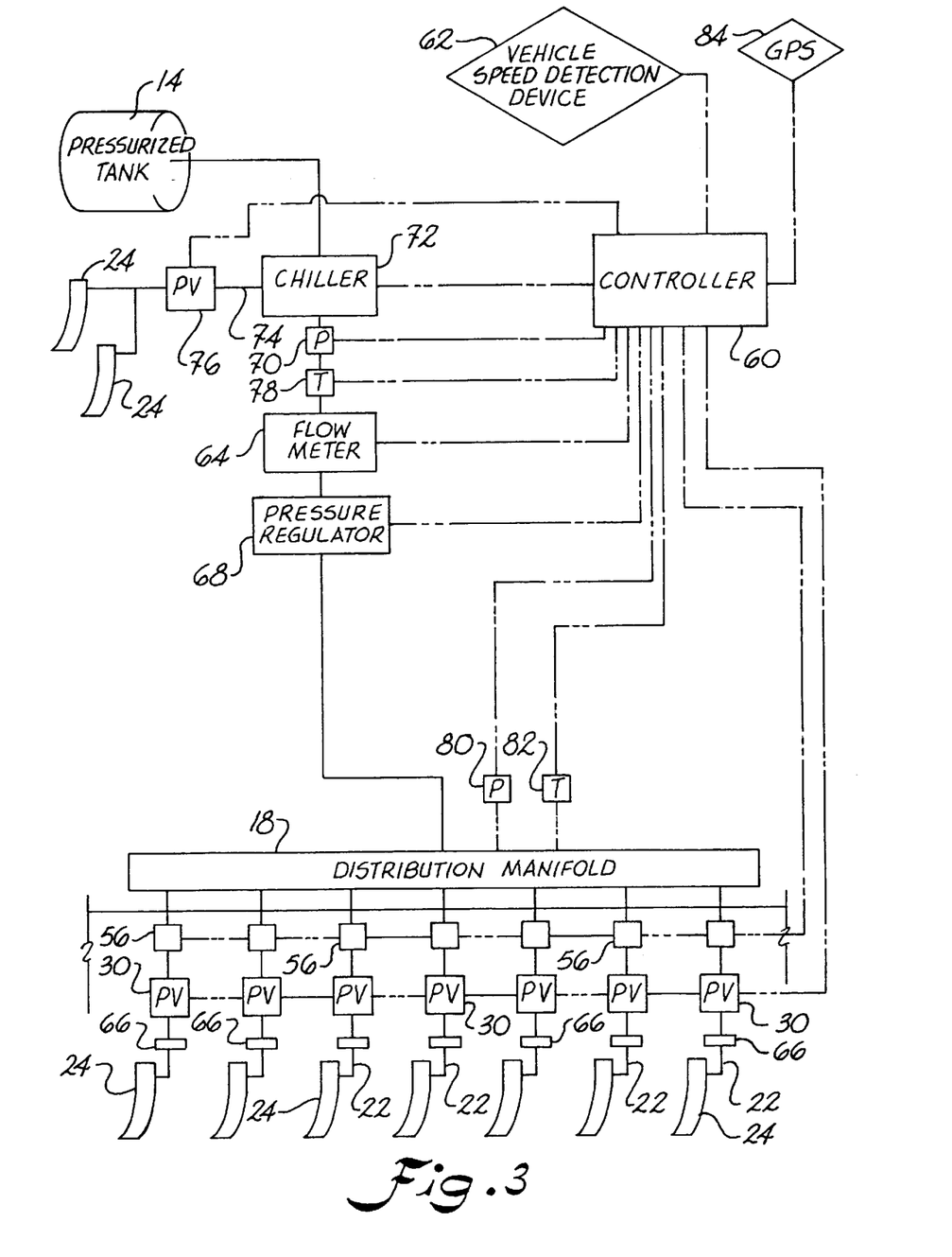
FIG. 3 is a diagrammatic illustration of one embodiment of a system for dispensing a volatile liquid fertilizer into a soil in accordance with the present invention.
Figure 4:
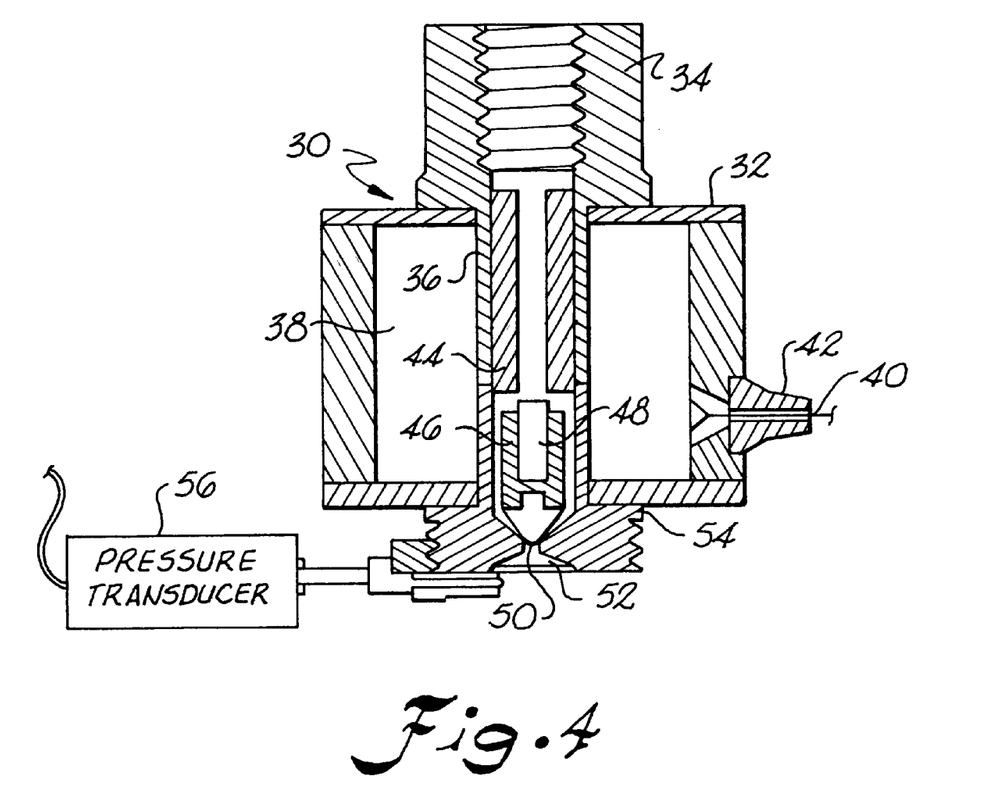
FIG. 4 is a cross-sectional view of an exemplary constant pressure flow control device for use in the process of the present invention.

In accordance with the present invention, system 10 further includes a plurality of constant pressure flow rate control devices 30 as more particularly shown in FIGS. 3 and 4. Each of the constant pressure flow rate control devices is placed adjacent to the distribution manifold 18 in communication with a corresponding supply line 20. Constant pressure flow rate control devices 30 are designed to serve two functions. First, flow rate control devices 30 control the flow rate of ammonia injected into the soil through each of the dispensing tubes 22. Second, flow rate control devices 30 are designed to control the flow rate of ammonia through dispensing tubes 22 without significantly decreasing the pressure within distribution manifold 18. More particularly, flow rate control devices 30 sustain back pressure within distribution manifold 18 in an amount sufficient to maintain the volatile liquid fertilizer, such as ammonia, in liquid form.

As described above, by maintaining ammonia as a liquid within distribution manifold 18, much more control is achieved over the fertilizer as it flows through the system. In particular, unwanted variations in the application rates of the fertilizer from dispensing tube to dispensing tube are prevented from occurring, increasing the uniformity of flow to each individual tube.

In one embodiment, each constant pressure flow rate control device 30 can include a valve that pulsates between an open position and a closed position by an actuator according to a duty cycle. Preferably, the valve is controlled by an electrically actuated solenoid, but may also be pneumatically or hydraulically actuated. The term duty cycle of the pulsating valve as used herein is defined as the percentage of time the valve is open divided by the total operation time. The duty cycle controls the flow rate of the fertilizer through the dispensing tubes in a rapid on/off manner.

Such pulsating valves as described above were developed by one of the present inventors for use in other systems. For instance, such valves are described in an article entitled "Droplet Size and Spray Pattern Characteristics of an Electronic Flow Controller for Spray Nozzles" by Giles, et al appearing in *The Journal of Agricultural Engineering Research,* Volume 47 at Pages 249–267 (1990); in an article entitled "Spray Droplet Velocity and Energy in Intermittent Flow From Hydraulic Nozzles" by Giles, et al appearing in *The Journal of Agricultural Engineering Research,* Volume 51 at Pages 101–112 (1992); in an article entitled "Intermittent Control of Liquid Flow From Fan Nozzles in Concurrent Air Streams: Wind Tunnel Studies of Droplet Size Effects" by Giles, et al appearing in *The Journal of Agricultural Engineering Research,* Volume 62 at Pages 77–84 (1995); in U.S. Pat. No. 5,134,961 to Giles, et al entitled "Electrically Actuated Variable Control System"; and in U.S. patent application Ser. No. 08/528,941 to Henderson (now U.S. Pat. No. 5,653,389) entitled "Independent Flow Rate and Droplet Size Control System and Method for Sprayer", all of which are herein incorporated by reference in their entireties. A particular commercially available solenoid-actuated valve that may be used in the present invention can be obtained from Kip, Inc. of Farmington, Conn.

FIG. 4 illustrates one embodiment of a pulsating valve 30 that may be used in the system of the present invention. Pulsating valve 30 includes a solenoid valve body 32 having an annular inlet fitting 34 on one side which is adapted to be connected to distribution manifold 18. A relatively thin tubular sleeve portion 36 extends from fitting 34 through valve body 32. Surrounding sleeve portion 36 within the body is a coil 38 which is connected to a pair of electrical leads 40 that extend through a fitting 42 for connection to a controller that controls the duty cycle of the valve.

Within sleeve portion 36 is a fixed annular core 44. Aligned with fixed core 44 is a movable valve member 46.

Extending from moveable valve member 46 is a coil spring 48 which engages the end of fixed core 44 and urges a tapered end 50 on moveable member 46 into a central opening 52 of a retainer ring 54. Retainer ring 54 is fixed to sleeve portion 36 and held firmly to the valve body 32. Retainer ring 54 is adapted to be connected to a corresponding supply line 20 as shown in FIG. 1.

In operation, pulsating valve 30 is magnetically opened when the activation of the coil by a pulse causes moveable member 46 to move towards fixed core 44. When the pulse ceases, the differential in pressure between the back and the front of moveable tapered end 50 or needle, plus the force of spring 48, causes moveable valve 46 to close. In an alternative form not shown, the moveable valve member could be electrically moved in both directions, thereby eliminating the spring and providing a somewhat different valving action.

During use, pulsating valve 30 can be connected to a controller via electrical leads 40. The controller, which can be a microprocessor or other programmable device, can be adapted to calculate a desired flow rate of the ammonia or fertilizer through the valve. Specifically, the controller can be a variable frequency, variable duty cycle, square wave generator that produces the output pulses with the desired frequency and width or time duration. Pulsating valve 30 then receives the signals from the controller and opens and closes in response to the output pulses. The signal generated by the controller and received by the valve determines the flow rate of the fertilizer flowing through the dispensing tubes.

Optionally, a flow meter such as a pressure transducer 56 may be placed in communication with pulsating valve 30. Pressure transducer 56 monitors the pressure drop across the valve producing a signal that is a direct indicator of the flow of the fertilizer through the valve. This signal can be used as a feedback to verify proper flow characteristics and flow rates. Thus, the controller can receive signals from pressure transducer 56, process them to determine if they correspond with the desired flow characteristics, and make corrections to the signal output to achieve more precise and accurate control of pulsating valve 30.

Referring to FIG. 3, one preferred embodiment of a volatile liquid fertilizer application system made in accordance with the present invention is illustrated. In a basic form, the system includes pressurized tank 14 containing liquid ammonia which is in communication with distribution manifold 18. Distribution manifold 18 is in turn connected to a plurality of dispensing tubes 22. Each dispensing tube 22 is connected to a corresponding pulsating valve 30 which controls the flow rate of ammonia through the system while preventing the ammonia from vaporizing in distribution manifold 18.

Once downstream from pulsating valves 30, the ammonia vaporizes as it is injected into a soil. Vaporization of the ammonia within dispensing tubes 22 serves to damp out any pulsation of the ammonia in the discharge, due to the pulsating action of the valves.

In order to control application rates, the system of the present invention can include a controller 60, such as a programmable device, which, as shown, is electrically connected to pulsating valves 30. As described above, controller 60 can be configured to send signals to pulsating valves 30 for controlling the frequency and duty cycle of the valves in order to discharge the ammonia at a desired flow rate.

In order to determine the proper flow rate, controller 60 can be in communication with a vehicle speed detection device 62. Vehicle speed detection device 62 monitors the speed of a vehicle upon which the system is mounted and sends the speed information to controller 60. Based on the speed information, controller 60 determines the flow rate of ammonia through pulsating valves 30 in order to arrive at a desired application rate expressed in quantity of fertilizer per area of land. Vehicle speed detection device 62 can be any suitable ground speed measurement device, such as a measuring device that may already be installed on the vehicle. For example, vehicle speed detection device 62 can be a conventional speedometer, a transducer, a radar device or a receiver which processes satellite signals to determine ground speed such as a Global Positioning System.

In order to monitor the flow rate of the liquid fertilizer through the system, a flow meter 64 can be placed between pressurized tank 14 and distribution manifold 18. Flow meter 64 as shown is in communication with controller 60. Specifically, flow meter 64 sends flow rate information to controller 60 for use in calculating the duty cycle of pulsating valves 30 in relation to the speed at which dispensing tubes 22 are moved across a field.

In addition to or as a replacement to flow meter 64, the system of the present invention can also include a plurality of flow meters 56 which monitor the flow rate of the fertilizer through each of the pulsating valves 30. As described above, in one embodiment, flow meters 56 can be pressure transducers which send flow rate information to controller 60.

Of particular advantage, by including flow meters 56, different fertilizer flow rates can be individually calculated and maintained at each of the pulsating valves 30. For instance, during some applications, it may be desirable only to apply fertilizer to a soil from only a selected number of dispensing tubes 22. For example, if a strip of a field that is to be treated is less than the width of the plurality of knives 24, then it may be desirable only to permit flow of the fertilizer through a portion of the dispensing tubes. In this manner, not only is the fertilizer conserved, but also the system prevents against over fertilizing a particular area.

In other applications, it may be desirable to have greater flow rates of the fertilizer through some of the dispensing tubes in comparison to the fertilizer flow rates through the remainder of the tubes. The system of the present invention permits individual flow rate control at each dispensing tube based on field conditions at any point in time.

In order for pulsating valves 30 to accurately dispense the liquid fertilizer at a desired flow rate, the fertilizer should remain as a liquid as it passes through the valve. Any significant vaporization prior to passing through valve 30 may prevent proper and accurate flow rate measurements by flow meter 64, may lead to non-uniform distribution of fertilizer in distribution manifold 18, and may interfere with the calculation of flow rates by controller 60 in determining the duty cycle of each pulsating valve 30.

In one embodiment, in order to ensure that no significant vaporization occurs within pulsating valves 30, an orifice 66 can be placed between each pulsating valve 30 and each dispensing tube 22. Orifice 66 can be designed to create sufficient pressure across each pulsating valve 30 to prevent against vaporization of the fertilizer. In order to create back pressure within each pulsating valve 30, orifice 66 would include an opening through which the fertilizer is fed that is smaller in size than the passageway through which the fertilizer travels through each valve. Orifice 66 may likely be required only when very low flow rates are desired. Also, orifice 66 could be incorporated into valve 30 itself. In fact, this is usually the case since there is an inherent orifice in the valve.

In order to also promote uniform fertilizer distribution throughout the system of the present invention, the duty cycles for adjacent pulsating valves 30 can be configured and networked to pulse the valves in different phases. In other words, when possible, controller 60 can control pulsating valves 30 in a manner such that when one pulsating valve is fully open, adjacent pulsating valves are closed or partly closed. Synchronization of the valves serves to prevent any possible pressure fluctuations from occurring in distribution manifold 18. During most applications, however, such phase adjustments between adjacent pulsating valves is not necessary.

As shown in FIG. 3, optionally the system of the present invention can also include a pressure regulator 68 positioned between pressurized tank 14 and distribution manifold 18. Pressure regulator 68 can be, for instance, a throttle valve that can be used for regulating the pressure of the ammonia as it enters distribution manifold 18. Controller 60 can control pressure regulator 68 for maintaining the pressure of the fertilizer within a predetermined range. Of importance is that the fertilizer be under sufficient pressure and at a temperature that maintains the fertilizer as a liquid without vaporization and the problems associated therewith.

For instance, in one embodiment, the system of the present invention can include a pressure sensing device 70, such as a pressure transducer, designed to indicate to controller 60 the pressure of the fertilizer. Based on the information received from pressure sensing device 70, controller 60 can adjust pressure regulator 68 as desired. Ultimately, the pressure of the liquid fertilizer can be used in calculating the particular duty cycle for each of the pulsating valves 30 for, again, preventing vaporization of the fertilizer. Pressure regulator 68 may also be used to maintain pressurized tank 14 within a particular pressure range for preventing the fertilizer from vaporizing in the tank.

Figure 5:
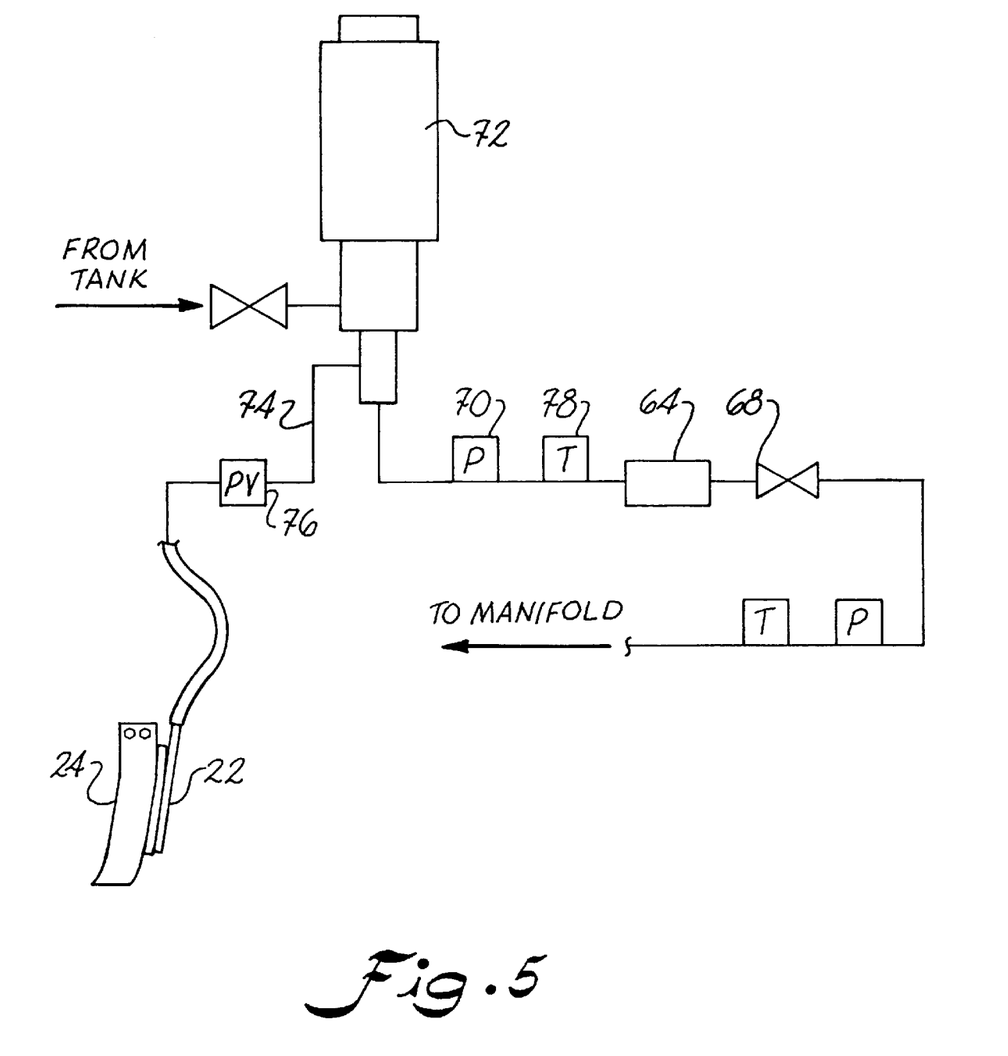
FIG. 5 is a side view (partially diagrammatic) of a cooling device for cooling a volatile liquid fertilizer that may be used in the process of the present invention.

Besides pressure control, the system of the present invention can also be equipped with a temperature control device, such as a chiller 72 as shown in FIG. 3 and FIG. 5. Besides increasing the pressure of the volatile liquid fertilizer, decreasing the temperature of the fertilizer also serves to maintain the fertilizer in a liquid form. Thus, pressure requirements within the system can be reduced if the temperature of the fertilizer is reduced.

As shown in FIG. 5, in one embodiment, chiller 72 can include a heat exchanger. The heat exchanger can be adapted to receive a small amount of the ammonia exiting pressurized tank 14 (less than 1% of the total flow). This small amount of ammonia can be vaporized and vented to atmospheric pressure. During vaporization, the ammonia absorbs heat causing the heat exchanger to cool. Specifically, the heat exchanger can be adapted to also receive the remainder of the ammonia exiting pressurized tank 14 which is cooled during the vaporization process.

The ammonia vented off can then be directed into a dispensing line 74 and injected into the soil by a dispensing tube 22. Optionally, a pulsating valve 76 in accordance with the present invention can be placed in dispensing line 74 to control the amount of ammonia that is vaporized and to maintain back pressure within chiller 72.

In one preferred embodiment, when the system of the present invention includes chiller 72, a temperature sensing device 78 is positioned between chiller 72 and distribution manifold 18. As shown in FIG. 3, temperature sensing device 78, which can be, for instance, a thermocouple or any other suitable temperature indicating instrument, is in communication with controller 60. Controller 60 in turn can be adapted to receive temperature information from temperature sensing device 78 and can be configured to control chiller 72. For instance, based on the temperature of the fertilizer, controller 60 can determine and control how much of the fertilizer is vaporized within chiller 72. In this manner, controller 60 can maintain the temperature of the fertilizer within a particular range as it enters distribution manifold 18. Consequently, the temperature and pressure of the liquid fertilizer can both be controlled. Further, both the temperature and pressure can be controlled independently of each other.

When the system of the present invention includes chiller 72, as shown in FIGS. 3 and 5, however, overcooling of the fertilizer should be prevented. If the fertilizer were to reach too low of a temperature, the fertilizer may behave more like a pure liquid than a liquified gas. Specifically, if the density of the fertilizer becomes too high, over application of the fertilizer in the soil may occur. By including temperature sensing device 78, in combination with controller 60, the present invention is well equipped to preventing such situations from occurring.

In one embodiment of the present invention, a further pressure sensing device 80 and a temperature sensing device 82 can be positioned within distribution manifold 18 and can be in communication with controller 60. Pressure sensing device 80 and temperature sensing device 82 can be used to continuously monitor the pressure and temperature of the liquid fertilizer within distribution manifold 80. The pressure and temperature information can then be sent to controller 60 for use in calculating flow rates, for controlling chiller 72, and for generally ensuring that the fertilizer does not vaporize within the system.

More particularly, controller 60 can be programmed with the thermodynamic state of the fertilizer, such as ammonia, at all temperatures and pressures. By receiving temperature and pressure information from pressure sensing devices 70 and 80 and from temperature sensing devices 78 and 82, controller 60 can be configured to precisely control the temperature, pressure, density, and vapor pressure of the fertilizer from pressurized tank 14 until it is ultimately injected into a soil through dispensing tubes 22. Through this arrangement, flow rates can be precisely controlled and measured as desired.

The ability to precisely control the volatile liquid fertilizer makes the system of the present invention especially well suited for use in precision agricultural applications. For instance, Global Positioning Systems (GPS), as described in U.S. Pat. No. 5,334,987 to Teach, have created opportunities for greater automation of agricultural application. In general, Global Positioning Systems use satellites and other devices to determine the immediate location of a vehicle in a field and then use prescription field maps to determine how much fertilizer or chemical should be applied at each location in the field.

In this regard, the system of the present invention as shown in FIG. 3 can include a GPS location and rate map device 84 in communication with controller 60. GPS location and rate map device 84 can provide continuous information to controller 60, which controller 60 can use to control the flow rate of fertilizer through each of the pulsating valves 30. Because the system of the present invention has extremely quick response times when changing flow rates, and because pulsating valves 30 allow individual flow rate control at each dispensing tube 22, the system is well suited to reacting almost instantaneously to information received from device 84.

Besides GPS devices, however, it should be appreciated that any means of providing information to controller 60 regarding the field being treated can be used in the process of the present invention.

As described above, the system of the present invention is particularly designed for injecting anhydrous ammonia into soil. Although depending upon the particular circumstances, application rates for ammonia generally range up to about 575 pounds of ammonia per acre. More particularly, ammonia typically is applied to fields at a rate of about 140 pounds per acre to about 215 pounds per acre. The actual flow rate of ammonia being dispensed from the system of the present invention with respect to these application rates will depend upon the speed of the vehicle on which the system is mounted. In general, vehicle speeds range from about 4 to 6 miles per hour. At these speeds, the flow rate of ammonia exiting the system of the present invention can be up to about 25 gallons per minute.

One of the more important aspects of the present invention is the ability of the system to maintain the ammonia in liquid form throughout the distribution manifold. During most operations, at ambient or near ambient temperatures, the pressure within the system can be up to about 300 psi, and particularly between about 50 psi to about 200 psi. During most applications, the target pressure range within the system should be from about 100 psi to about 150 psi.

At a pressure range between about 50 psi to about 250 psi, the maximum temperature within the system should be from about 30° F. to about 100° F. respectively, in order to maintain the ammonia in liquid form. Preferably, within the above described pressure ranges, however, the temperature of the ammonia should be within a range of from about 0° F. to about 40° F. As described above, if necessary, chiller 72 can be used to maintain the temperature of the ammonia within the above described ranges.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A system for maintaining a volatile liquid fertilizer in a liquid form while dispensing controlled amounts of the volatile liquid fertilizer into a soil, said system comprising:
   a fertilizer reservoir for holding a volatile liquid fertilizer under pressure sufficient to maintain at least a portion of said fertilizer in a liquid form, said fertilizer reservoir including an outlet for dispensing said liquid fertilizer;
   a distribution manifold in communication with said outlet of said fertilizer reservoir, said distribution manifold being connected to a plurality of dispensing tubes designed to inject said volatile liquid fertilizer into the soil;
   at least one flow meter for monitoring the flow rate of said volatile liquid fertilizer;
   a plurality of constant pressure flow rate control devices, each of said flow rate control devices being in communication with and placed on a corresponding dispensing tube, said constant pressure flow rate control devices controlling the flow rate at which said volatile liquid fertilizer is dispensed from said dispensing tubes while preventing said volatile liquid fertilizer from vaporizing within said distribution manifold; and
   a controller in communication with said at least one flow meter and said constant pressure flow rate control devices, said controller receiving flow rate information from said at least one flow meter and, based on said information, adjusting said constant pressure flow rate control devices for dispensing said volatile liquid fertilizer at a selected flow rate while maintaining said volatile liquid fertilizer at a pressure within said distribution manifold sufficient to maintain said volatile liquid fertilizer in a liquid form.

2. A system as defined in claim 1, further comprising a pressure control device for controlling the pressure at which said volatile liquid fertilizer is dispensed from said fertilizer reservoir.

3. A system as defined in claim 1, wherein each of said constant pressure flow rate control devices comprises a valve that pulsates between open and closed positions according to a duty cycle.

4. A system as defined in claim 3, wherein said duty cycle of each of said constant pressure flow rate control devices is determined and controlled by said controller.

5. A system as defined in claim 1, wherein said controller is configured to control said constant pressure flow rate control devices independently for selectively varying the flow rate of said volatile liquid fertilizer between each of said dispensing tubes.

6. A system as defined in claim 1, further comprising a cooling device for cooling said volatile liquid fertilizer exiting said fertilizer reservoir.

7. A system as defined in claim 6, wherein said cooling device includes a heat exchanger in contact with said volatile liquid fertilizer exiting said fertilizer reservoir, said heat exchanger receiving and vaporizing a portion of said volatile liquid fertilizer for cooling the remainder of said volatile liquid fertilizer entering said distribution manifold.

8. A system as defined in claim 7, further comprising a temperature sensing device for monitoring the temperature of said volatile liquid fertilizer adjacent to said cooling device, said temperature sensing device sending temperature information to said controller, said controller, based on said temperature information, being configured to control the amount of volatile liquid fertilizer being vaporized by said cooling device for controlling the temperature of said volatile liquid fertilizer entering said distribution manifold.

9. A system as defined in claim 1, further comprising:
   a cooling device for selectively cooling said volatile liquid fertilizer exiting said fertilizer reservoir;
   at least two temperature sensing devices, one of said temperature sensing devices monitoring the temperature of said volatile liquid fertilizer after being cooled by said cooling device, said at least second temperature sensing device monitoring the temperature of said volatile liquid fertilizer within said distribution manifold, said at least two temperature sensing devices sending temperature information to said controller;
   a pressure sensing device for monitoring the pressure of said volatile liquid fertilizer within said distribution manifold, said pressure sensing device sending pressure information to said controller; and
   wherein said controller is configured to receive said temperature and pressure information from said temperature sensing devices and from said pressure sensing device and, based on said information, to control said cooling device, and each of said constant pressure flow rate control devices for maintaining said volatile liquid fertilizer within preset temperature and pressure ranges within said system.

10. A system as defined in claim 1, further comprising a speed sensing device for sensing the speed at which said system is moved over a field, said controller receiving speed information from said speed sensing device for determining the flow rate at which said volatile liquid fertilizer is dispensed into said soil.

11. A process for dispensing controlled amounts of a volatile liquid fertilizer into a soil, said process comprising the following steps:

providing a volatile liquid fertilizer in a pressurized vessel, the pressure in said vessel being sufficient to maintain at least a portion of said volatile liquid fertilizer in a liquid form;

dispensing said volatile liquid fertilizer into a distribution manifold;

sensing the flow rate of said volatile liquid fertilizer;

injecting said volatile liquid fertilizer into a soil using a plurality of dispensing tubes, each of said dispensing tubes being in fluid communication with said distribution manifold and with a constant pressure flow rate control device, said constant pressure flow rate control devices being placed on said dispensing tubes and being configured to control the flow rate of the volatile liquid fertilizer through the dispensing tubes; and maintaining said volatile liquid fertilizer in a liquid form throughout said distribution manifold by maintaining pressure within said distribution manifold, wherein said constant pressure flow rate control devices are configured to dispense the volatile liquid fertilizer without significantly reducing the pressure of the liquid fertilizer in the distribution manifold.

12. A process as defined in claim 11, wherein said volatile liquid fertilizer comprises ammonia.

13. A process as defined in claim 11, further comprising the step of controlling the pressure at which said volatile liquid fertilizer is dispensed from said pressurized vessel.

14. A process as defined in claim 11, further comprising the step of cooling said volatile liquid fertilizer dispensed from said pressurized vessel.

15. A process as defined in claim 14, wherein said volatile liquid fertilizer is cooled by vaporizing a portion of said volatile liquid fertilizer dispensed from said pressurized vessel, said vaporized portion of said volatile liquid fertilizer extracting heat from the remainder of said volatile liquid fertilizer for cooling the same.

16. A process as defined in claim 11, wherein each of said constant pressure flow rate control devices comprises a valve that pulsates between open and closed positions according to a duty cycle.

17. A process as defined in claim 11, wherein said volatile liquid fertilizer is maintained at a pressure within said distribution manifold between about 50 psi to about 200 psi.

18. A process as defined in claim 12, wherein said ammonia is injected into said soil at an application rate of from about 140 pounds per acre to about 215 pounds per acre.

19. A process as defined in claim 11, further comprising the step of sensing the speed at which said dispensing tubes are moved across a field for determining the flow rate at which said volatile liquid fertilizer is injected into said soil.

20. A process as defined in claim 11, further comprising the step of individually controlling the flow rate at which said volatile liquid fertilizer is dispensed from each of said dispensing tubes.

21. A process for dispensing controlled amounts of ammonia into a soil, said process comprising the following steps:

providing a pressurized vessel containing ammonia, said ammonia being under sufficient pressure within said vessel to maintain at least a portion of said ammonia in a liquid form;

dispensing said liquid ammonia from said pressurized vessel into a distribution manifold;

sensing the flow rate of said ammonia dispensed from said pressurized vessel;

injecting said ammonia into a soil at a predetermined flow rate through a plurality of dispensing tubes which are in fluid communication with said distribution manifold, said flow rate being controlled by a corresponding plurality of constant pressure flow rate control devices, each of said flow rate control devices being in communication with and being placed on a corresponding dispensing tube, said constant pressure flow rate control devices controlling the flow rate of ammonia through each of said dispensing tubes while maintaining back pressure within said distribution manifold sufficient to maintain said ammonia in a liquid form.

22. A process as defined in claim 21, further comprising the step of selectively cooling said ammonia dispensed from said pressurized vessel for maintaining said ammonia within a preset temperature range.

23. A process as defined in claim 21, wherein the pressure of said ammonia within said distribution manifold is maintained in a range of from about 50 psi to about 300 psi.

24. A process as defined in claim 21, wherein said flow rate of said ammonia is sensed at each of said dispensing tubes for individually controlling the flow rate at which said ammonia is dispensed from each of said dispensing tubes.

25. A process as defined in claim 22, further comprising the step of sensing the temperature and pressure of said ammonia at selected locations for maintaining said ammonia within said distribution manifold within preset temperature and pressure ranges.

26. A system for maintaining ammonia in a liquid form while dispensing controlled amounts of the ammonia into a soil, said system comprising:

a fertilizer reservoir for holding ammonia under pressure sufficient to maintain at least a portion of the ammonia in a liquid form;

a distribution manifold in communication with said fertilizer reservoir, said distribution manifold being connected to a plurality of dispensing tubes designed to inject said ammonia into a soil;

at least one flow meter positioned upstream from the distribution manifold for monitoring the flow rate of said ammonia;

a cooling device for selectively cooling the ammonia exiting said fertilizer reservoir;

a plurality of constant pressure flow rate control devices, each of said flow rate control devices being in communication with and placed on a corresponding dispensing tube, each of said constant pressure flow rate control devices comprising a pulsating valve for controlling the flow rate at which said ammonia is dispensed from said dispensing tubes while simultaneously being adapted to maintain sufficient back pressure within said distribution manifold to maintain the ammonia in a liquid form; and a controller in communication with said at least one flow meter and said pulsating valves, said controller receiving flow rate information from said at least one flow meter and, based on said information, adjusting said pulsating valves for dispensing said ammonia at selected flow rates.

27. A system as defined in claim 26, further comprising:

at least two temperature sensing devices, one of said temperature sensing devices monitoring the temperature of said ammonia adjacent to said cooling device, said at least second temperature sensing device monitoring the temperature of said ammonia within said distribution manifold, said at least two temperature sensing devices sending temperature information to said controller;

a pressure sensing device for monitoring the pressure of said ammonia within said distribution manifold, said pressure sensing device sending pressure information to said controller; and wherein said controller, based on said temperature and pressure information, is configured to control said cooling device and each of said pulsating valves for maintaining said ammonia within preset temperature and pressure ranges within said distribution manifold.

28. A system as defined in claim 27, wherein said controller is programmed with the thermodynamic properties of ammonia for maintaining said ammonia at a particular density and vapor pressure within said distribution manifold.

29. A system as defined in claim 26, further comprising a global positioning location and rate map device in communication with said controller, said global positioning rate map device being configured to determine the location of said dispensing tubes, said controller receiving information from said global positioning rate map device and, based on said information, determining ammonia flow rates used in controlling said pulsating valves.

\* \* \* \* \*